US 12,158,205 B2

(12) United States Patent
Yildir

(10) Patent No.: US 12,158,205 B2
(45) Date of Patent: Dec. 3, 2024

(54) LAY-SHAFT ASSEMBLY FOR USE IN A VEHICLE TRANSMISSION

(71) Applicant: PUNCH POWER TRAIN PSA E-TRANSMISSIONS N.V., Sint-Truiden (BE)

(72) Inventor: Umut Yildir, Sint-Truiden (BE)

(73) Assignee: PUNCH POWERTRAIN PSA E-TRANSMISSIONS N.V., Sint-Truiden (BE)

( * ) Notice: Subject to any disclaimer, the term of this patent is extended or adjusted under 35 U.S.C. 154(b) by 0 days.

(21) Appl. No.: 18/010,670

(22) PCT Filed: Jun. 8, 2021

(86) PCT No.: PCT/EP2021/065240
§ 371 (c)(1),
(2) Date: Dec. 15, 2022

(87) PCT Pub. No.: WO2021/254819
PCT Pub. Date: Dec. 23, 2021

(65) Prior Publication Data
US 2023/0228328 A1 Jul. 20, 2023

(30) Foreign Application Priority Data
Jun. 17, 2020 (NL) ..................................... 2025845

(51) Int. Cl.
*F16H 63/30* (2006.01)
*F16D 11/14* (2006.01)
(Continued)

(52) U.S. Cl.
CPC ............ *F16H 63/30* (2013.01); *F16D 11/14* (2013.01); *F16D 23/025* (2013.01); *F16H 3/087* (2013.01); *F16H 2063/3093* (2013.01)

(58) Field of Classification Search
CPC .. F16H 63/30; F16H 3/087; F16H 2063/3093; F16H 2003/0807;
(Continued)

(56) References Cited

U.S. PATENT DOCUMENTS

| | | | |
|---|---|---|---|
| 6,755,090 B2 * | 6/2004 | Ima | F16D 23/06 192/48.91 |
| 7,121,393 B1 | 10/2006 | Skipper | |
| 7,370,742 B2 * | 5/2008 | Rudle | F16H 3/006 192/48.91 |

FOREIGN PATENT DOCUMENTS

| | | |
|---|---|---|
| EP | 3312446 A3 | 6/2018 |
| WO | 2017157377 A1 | 9/2017 |
| WO | 2020007943 A1 | 1/2020 |

OTHER PUBLICATIONS

International Search Report and Written Opinion for the International Patent Application No. PCT/EP2021/065240, mailed Aug. 19, 2021, 14 pages.

* cited by examiner

*Primary Examiner* — Victor L McArthur
(74) *Attorney, Agent, or Firm* — KDW Firm PLLC

(57) ABSTRACT

A lay-shaft assembly for use in a vehicle transmission includes a clutching mechanism with a synchronization assembly arranged for synchronizing rotation of a driven gearwheel with a first gearwheel or a second gearwheel. The first and second gearwheels extend adjacently with respect to each other along the central axis, and the synchronizing assembly is positioned between adjacent respective outer circumferential surfaces of the adjacent first and second gearwheels and the sleeve. A ring-shaped biasing means support and a complementary biasing means insert for placing onto the ring shaped biasing means support.

20 Claims, 12 Drawing Sheets

(51) Int. Cl.
*F16D 23/02* (2006.01)
*F16H 3/087* (2006.01)

(58) Field of Classification Search
CPC .. F16H 2055/178; F16D 11/14; F16D 23/025; F16D 21/04; F16D 2023/0618; F16D 2023/0631; F16D 23/06
See application file for complete search history.

LAY-SHAFT ASSEMBLY FOR USE IN A VEHICLE TRANSMISSION

This application is a national stage filing under 35 U.S.C. 371 of pending International Application No. PCT/EP2021/065240, filed Jun. 8, 2021, which claims priority to Netherlands Patent Application No. 2025845, filed Jun. 17, 2020, the entirety of which applications are incorporated by reference herein.

The present patent disclosure relates to a lay-shaft assembly for use in a vehicle transmission, a ring shaped biasing means support for use in a clutching mechanism, a biasing means insert for use with the ring shaped biasing means support, a vehicle transmission and a vehicle.

A vehicle transmission for road vehicles nowadays often comprise a synchronized gearbox. Such a synchronized gearbox typically comprises an input shaft coupled to an engine's crankshaft, and an output shaft which lies in line with the input shaft and is coupled to wheels of the vehicle. To rotationally couple the input shaft to the output shaft, the vehicle transmission comprises one or more lay-shaft assemblies. Such a lay-shaft assembly comprises a lay-shaft which is rotatable around a central axis and is provided with gearwheels. Typically one gearwheel of those gearwheels is fixedly connected to the lay-shaft and the others can be selectively coupled to the lay-shaft by means of a clutching mechanism. This clutching mechanism is usually situated in between the connectable gearwheels, so that they can be controlled by a single operating lever, e.g. a shift fork. Typically the clutching mechanism comprises a dual-synchronizer including a synchronizer hub fixedly connected to the lay-shaft, and a sleeve movable in an axial direction of the lay-shaft. The sleeve can be movable in a first engaging position, wherein a rotation of the hub is coupled to a rotation of a first one of the connectable gearwheels, a second engaging position, wherein the rotation of the hub is coupled to rotation of a second one of the connectable gearwheels, and a neutral position, wherein the rotation of the hub is free of the rotation of the connectable gearwheels.

A disadvantage of such a clutching mechanism is that it requires many parts connected to the lay-shaft, thus increasing the size of the lay-shaft assembly. Especially since many gearboxes comprise more than one of these lay-shaft assemblies, this makes the gearboxes bulky.

It is an object, among objects, to provide an improved lay-shaft assembly. In particular, one object is to decrease the size of the lay-shaft assembly.

According to a first aspect, there is provided a lay-shaft assembly for use in a vehicle transmission, comprising:
  a lay-shaft arranged rotatably around a central axis;
  a first gearwheel arranged rotatably around the lay-shaft and the central axis;
  a second gearwheel arranged around the lay-shaft around the central axis; and
  a clutching assembly arranged rotatably around the lay-shaft and the central axis and comprising:
    a driven gearwheel,
    a clutching mechanism comprising a movable sleeve for selectively coupling rotation of the driven gearwheel to either of the first gearwheel and the second gearwheel,
  wherein the clutching mechanism further comprises a synchronization assembly arranged for synchronizing rotation of the driven gearwheel with the first gearwheel or the second gearwheel,
  wherein the first and second gearwheels extend adjacently with respect to each other along the central axis, and
  wherein the synchronizing assembly is positioned between adjacent respective outer circumferential surfaces of the adjacent first and second gearwheels and the sleeve.

Beneficially, since the first gearwheel and the second gearwheel are only minimally spaced apart, e.g. only by bearing means (such as needle bearings) or the usual spacing required in gear assemblies, the length of the lay-shaft assembly is reduced. Since the synchronization assembly is positioned on an outer circumferential surface of the gears, there is no need for a synchronization hub. Also, the sleeve can be operated with a single operating lever. Since there is no need for the synchronization assembly to be linked to the lay-shaft itself, the number of (moving) parts is reduced.

The sleeve is preferably selectively movable between the first and the second gearwheels while coupled to the driven gearwheel and/or the sleeve is movable in an axial direction parallel to the central axis.

The sleeve may be movable in a first engaging position, wherein a rotation of the driven gear is coupled to a rotation of the first gearwheel via the sleeve, a second engaging position, wherein the rotation of the driven gear is coupled to rotation of a second gearwheel via the sleeve, and a neutral position, wherein the rotation of the driven gear and sleeve is free of the rotation of the connectable gearwheels.

In an embodiment, the synchronization assembly further comprises biasing means configured for biasing the sleeve to a decoupled position wherein the sleeve is disengaged from the first gearwheel and the second gearwheel, and a support body configured for at least partially supporting the biasing means and positioned adjacent to the outer circumferential surface of the first gearwheel and the outer circumferential surface of the second gearwheel.

In the present application, the biasing means is preferably a biasing mechanism. Whenever "biasing means" is referred to, this can be exchanged with "biasing mechanism", and vice versa.

In an embodiment, the driven gearwheel extends adjacent to the first or second gearwheel along the central axis. This allows the lay-shaft assembly to be even more compact.

In another embodiment, the sleeve is supported by the driven gearwheel.

In yet another embodiment, movement of the sleeve is limited by a protrusion engaging stop surface in the driven gearwheel.

In a further embodiment, the support body is ring shaped. Preferably, the support body is held in at least a fixed radial position relative to the central axis only by the sleeve. The support body may be positioned along an inner surface of the sleeve.

Beneficially, the support body is neither coupled nor bearing mounted to the lay-shaft, thus reducing the number of parts, in particular also the parts prone to wearing such as bearings.

Further embodiments are defined by the appended claims and may comprise a ring shaped biasing means support and optionally the biasing means insert described below.

According to a second aspect, there is provided a ring shaped biasing means support for use in a clutching mechanism comprising a movable cylindrically shaped clutching sleeve, the ring shaped support comprising
  one or more first supporting structures positioned at an outer side of the rings shaped support and configured to contact with respective one or more complementary supporting structures at an inner side of the sleeve, such that the ring shaped support is supported by the sleeve and rotates with the sleeve around a central axis when the ring shaped support is placed along the inner side of the sleeve;

one or more second supporting structures each at least partially positioned along an outer side of the ring shaped support and configured to support biasing means configured for biasing the sleeve to a central position with respect to the ring shaped support.

Beneficially, the ring shaped support is configured to be only supported by the sleeve, and thus a synchronizing hub is no longer required in a clutching mechanism and/or lay-shaft assembly/synchronizer. As will be understood, the ring shaped biasing means support may be comprised in the synchronizing assembly of the lay-shaft assembly described above and below.

In one embodiment, as will become apparent from the below description of figures, the ring shaped biasing means support comprises the biasing means. In other words, the biasing means are integrated therein. In an alternative embodiment, the ring shaped biasing means support is configured to receive one or more biasing means inserts which comprise the biasing means.

According to a third aspect, there is provided a biasing means insert or extension configured to be attached to the ring shaped biasing means support, wherein the biasing means insert comprises the biasing means configured for biasing the sleeve to a central position with respect to the ring shaped support when the biasing means insert is attached to the ring shaped support, and one or more supporting structures each at least partially positioned along an inner side of the biasing means insert and configured to attach to complementary supporting structures of the ring shaped biasing means.

Beneficially, the biasing means may be more easily replaced rather than replacing the whole ring shaped biasing means support. The combination of the ring shaped biasing means support and the biasing means insert may furthermore comprise more types of shapes and surfaces, while still common manufacturing techniques such as punching can be used, thus reducing part cost.

The biasing means as part of any of the above aspects may each comprise a first end and a second end, wherein the biasing means are lever shaped and each extend from the first end to the second end in a direction parallel to the central axis, wherein the first end is in a fixed position relative to the biasing means insert and the second end is configured to reversibly bend in a radial direction with respect to the central axis, wherein preferably the biasing means are shaped as leaf springs.

Beneficially, this configuration is very compact compared to often used ball-detent assemblies.

The biasing means may comprise a tongue which is movable between an inward and an outward position, wherein the tongue is biased towards the outward position The sleeve may comprise guiding surfaces cooperating with the biasing means for urging the tongues towards the engaged position.

The biasing means may comprise a first type of biasing means and a second type of biasing means, wherein the first type of biasing means is configured to bias the sleeve towards the central position in a first axial direction from a first axial end surface towards a second axial end surface of the biasing means insert, wherein the second type of biasing means is configured to bias the sleeve towards the central position in a second axial direction from the second axial end surface to the first axial end surface.

With this configuration, the sleeve is biased towards the neutral/central position symmetrically in both directions.

According to a further aspect, there is provided an assembly comprising the ring shaped biasing means support and the biasing means insert.

It will be understood that the lay-shaft assembly according to the first aspect may comprise the ring shaped biasing means support according to the above aspects, and/or the assembly also comprising the biasing means insert.

According to a further aspect, there is provided the sleeve for use in a clutching mechanism of any of the lay-shaft assemblies described herein. In particular, the sleeve comprises teeth on an inner surface thereof which teeth are configured to lock with the first gearwheel and the second gearwheel. In addition, a first type of the teeth comprises a depression at a first axial end thereof and a second type of the teeth comprises a depression at a second axial end thereof. The first and second types of teeth are configured to interact with the biasing means or biasing mechanism of a support body as described herein.

According to another aspect, the sleeve according to any one of the described embodiments may be provided. The sleeve may comprise a receiving structure, such as a cavity or opening, at an inner side thereof for receiving a biasing mechanism, such as a spring and biasing element. The biasing element may comprise a protrusion that is configured to interact with a complementary depression in a support body as described above and below. The sleeve may be configured to receive and rotationally hold the support body at the inner side thereof. The biasing element may comprise a ball shaped portion as the protrusion. An assembly or kit of parts of the sleeve, support body and biasing mechanism is a further aspect of the present patent disclosure. The assembly or kit of parts may further comprise two synchronizer rings.

In accordance with yet another aspect, the sleeve and synchronizer assembly may be applied in any part of a vehicle transmission wherein first and second gear wheels would then be situated adjacent each other with the synchronizer assembly positioned as defined above.

According to another aspect, there is provided a vehicle transmission comprising any of the above lay-shaft assemblies.

In accordance with yet another aspect, there is provided a vehicle comprising the vehicle transmission.

Further embodiments of the above aspects are defined by the appended claims and may additionally follow from the below description of the drawings.

The effects and advantages of the vehicle transmission and the vehicle according to the above aspects are at least the same as the effects and advantages of the lay-shaft assembly according to the various above aspects and the effects and advantages are inserted here by reference.

The accompanying drawings are used to illustrate presently preferred non-limiting exemplary embodiments of devices of the present disclosure. The embodiments may be combined or may be applied separately from each other. The above and other advantages of the features and objects of the disclosure will become more apparent and the aspects and embodiments will be better understood from the following detailed description when read in conjunction with the accompanying drawings, in which.

Figure 1:
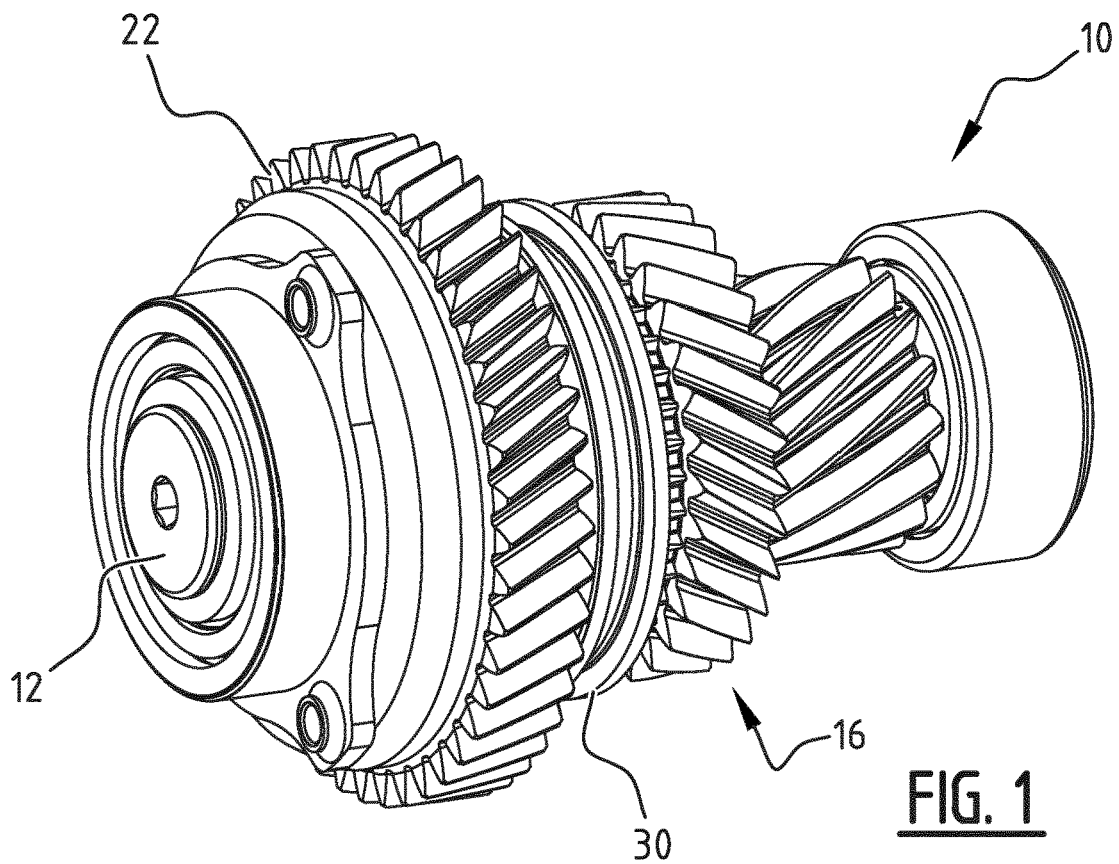
FIG. 1 shows a perspective side view of an example of the lay-shaft assembly.
Figure 2:
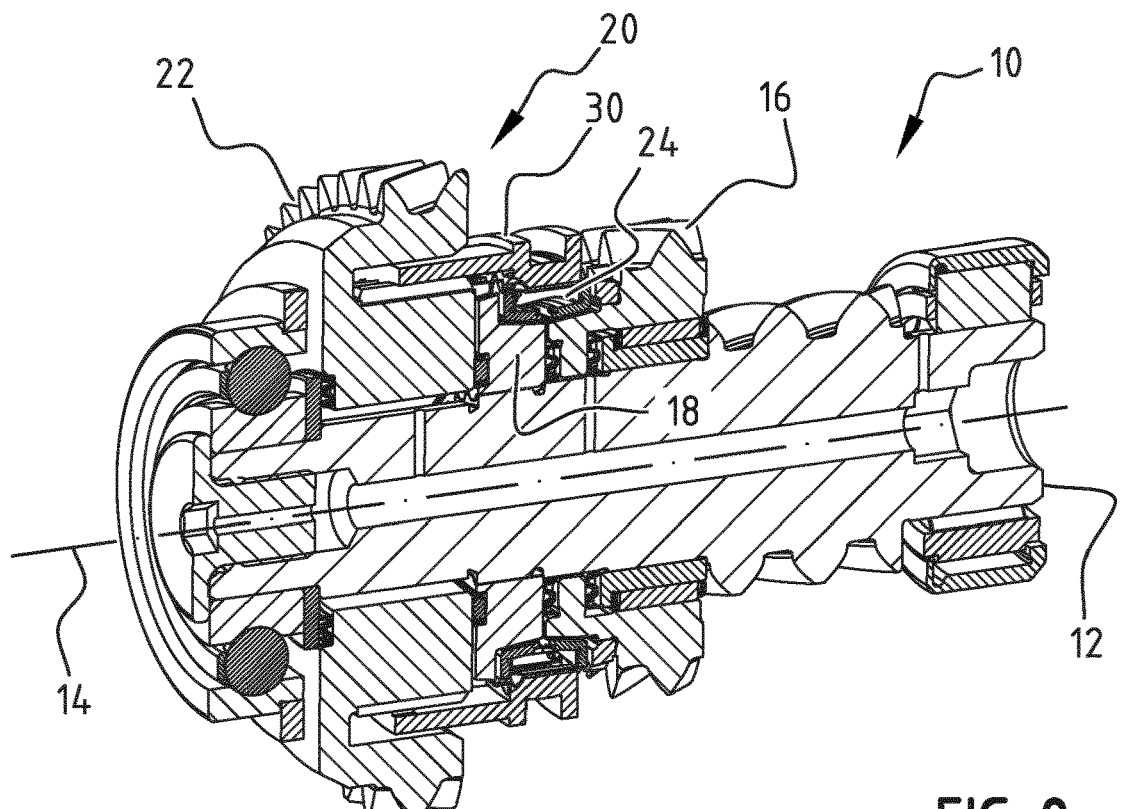
FIG. 2 shows a perspective cross section view of the example of the lay-shaft assembly.

Similar or corresponding features are denoted by similar or corresponding reference signs.

The lay-shaft assembly 10 comprises a lay-shaft 12 arranged rotatably around a central axis 14, a first gearwheel 16 arranged rotatably around the lay-shaft 12 and the central axis 14, a second gearwheel 18 arranged around the lay-shaft 12 around the central axis 14, and a clutching assembly arranged rotatably around the lay-shaft 12 and the central axis 14.

The clutching assembly comprises a driven gearwheel 22, and a clutching mechanism 20 comprising a movable sleeve 30 for selectively coupling rotation of the driven gearwheel 22 to either of the first gearwheel 16 and the second gearwheel 18. The clutching mechanism 20 further comprises a synchronization assembly 24 arranged for synchronizing rotation of the driven gearwheel 22 with the first gearwheel 16 or the second gearwheel 18. The first 16 and second 18 gearwheels extend adjacently with respect to each other along the central axis 14. The synchronizing assembly 24 is positioned between adjacent respective outer circumferential surfaces 17 and 19 of the adjacent first 16 and second 18 gearwheels and the sleeve 30.

The synchronization assembly 24 may comprise a biasing mechanism 36 configured for biasing the sleeve 30 to a decoupled position (see FIG. 6A and FIG. 7A) wherein the sleeve is disengaged from the first gearwheel 16 and the second gearwheel 18.

The synchronization assembly 24 may also comprise a support body 28 (see FIG. 5) configured for at least partially supporting the biasing mechanism 36 and positioned between the sleeve 30 and the first 16 and second 18 gearwheels, preferably adjacent to the outer circumferential surface 17 of the first gearwheel 16 and the outer circumferential surface 19 of the second gearwheel 18.

The support body 28 may be ring shaped. The support body may be positioned along an inner surface of the sleeve 30. As can be seen, the support body 28 is only supported by the sleeve 30, removing the need for a separate synchronizing hub. In other words, the support body 28 is neither coupled nor bearing mounted to the lay-shaft, except via the sleeve 30. The support body 28 may be positioned at least partially around the first 16 and second 18 gearwheels.

The support body 28 is positioned in a recess formed by tapered outer circumferential surfaces 17 and 19 of the first 16 and second 18 gear wheels respectively. The first 16 and second 18 gearwheels respectively comprise a first axial end 162 and 182 and a second axial end 164 and 184 and the first axial end 162 of the first gearwheel 16 is adjacent to the second axial end 184 of the second gearwheel 18.

Figure 3:
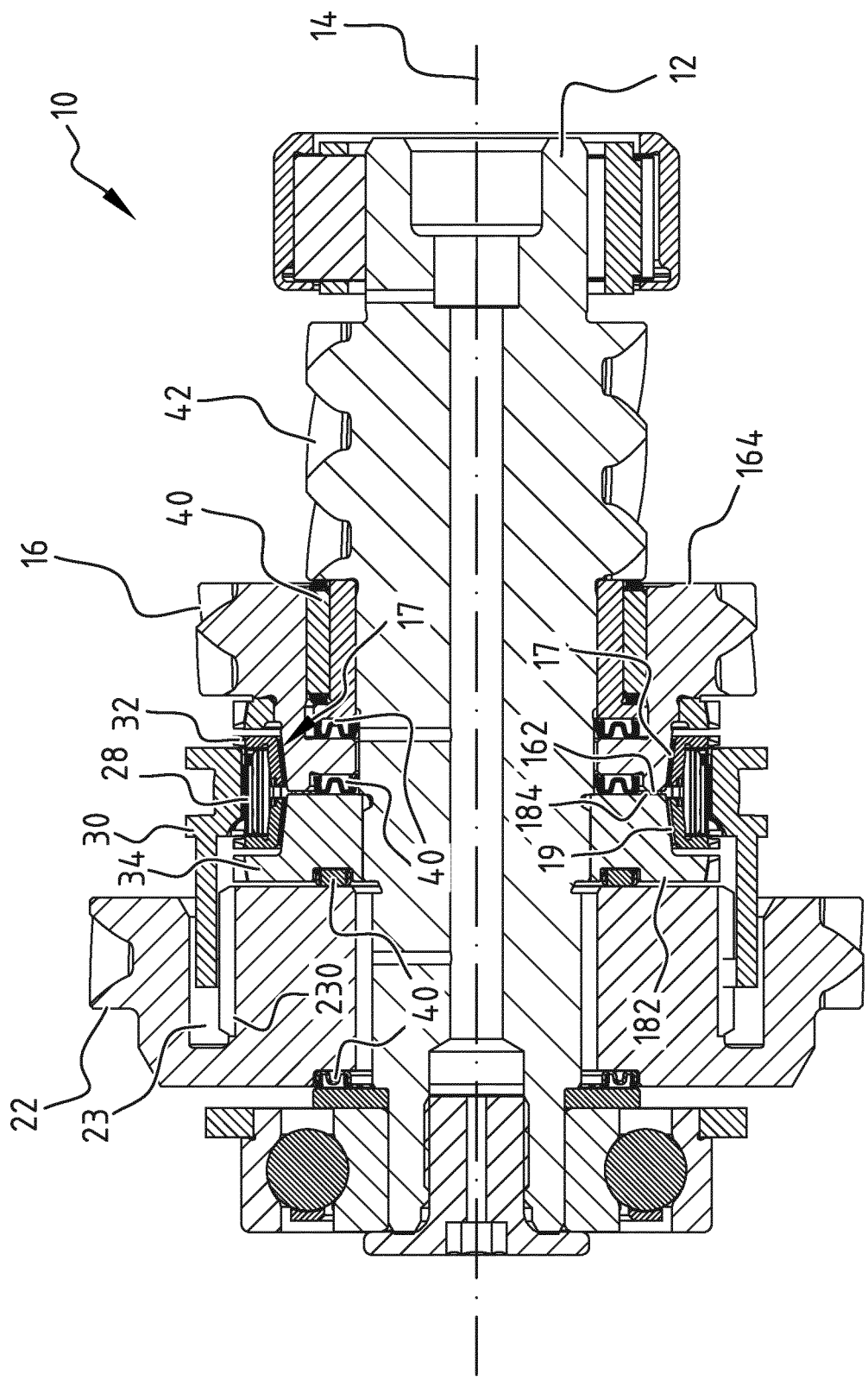
FIG. 3 shows a cross section view of the example of the lay shaft assembly.

In the present examples, see e.g. FIG. 3, the driven gearwheel 22 extends adjacent to the second gearwheel 18. The sleeve 30 supported by driven gear wheel 22 and extends within a ring shaped cavity 23, extending partially into the driven gear wheel 22. An inner surface 230 of the driven gearwheel 22 in the cavity 23 comprises splines or teeth and/or grooves that interact with complementary grooves and/or splines or teeth of the sleeve 30, so that the sleeve 30 rotates with the driven gearwheel 22 but can move in an axial direction parallel to the central axis 14. The movement of the sleeve 30 in the axial direction may be limited by the end wall of the cavity 23 on a second axial end side 58 of the sleeve 30 and by a surface of the first gearwheel 16 on the first axial end side 60 of the sleeve 30. The movement of the sleeve 30 in the axial direction may alternatively or additionally be limited by a protrusion engaging stop surface in the driven gearwheel 33. Between the driven gearwheel 22 and the lay shaft 12 may be placed bearing elements such as row needle roller bearings (not shown).

The lay-shaft assembly 10 may comprise a third gearwheel 42 fixedly connected to the lay-shaft 12 and arranged to rotate with the lay-shaft around the central axis 14. The first gearwheel 16 is preferably fixedly connected to the lay-shaft 12 such that rotation of the first gearwheel 16 causes rotation of the third gearwheel 42.

Figure 15:
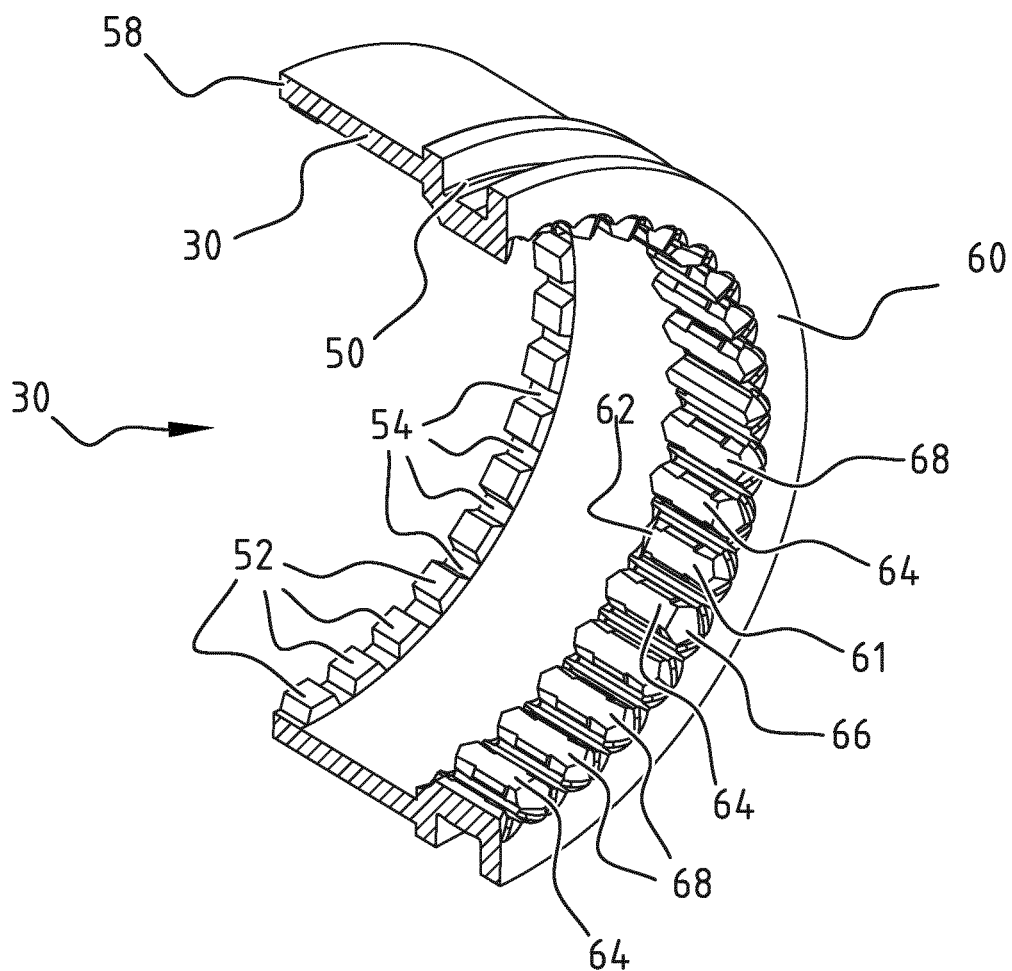
FIG. 15 shows a perspective cut side view of the sleeve of the example lay-shaft assembly of FIG. 1.

As shown in more detail in FIG. 15, the sleeve 30 may comprise splines 52 and grooves 54 which work together with complementary grooves and splines of the driven gearwheel 33. The sleeve 30 may also comprise a plurality of teeth 61, 64 and 68, of which teeth 61 and 64 work together with the biasing mechanism 36. This is described in further detail below.

Figure 4:
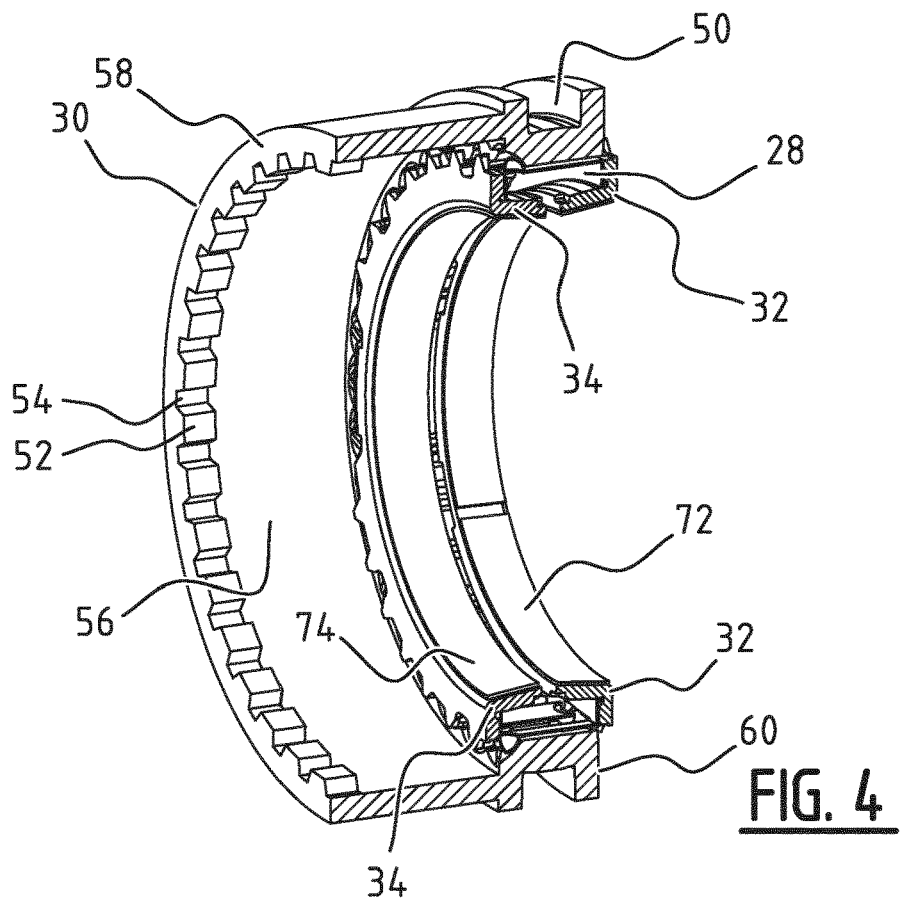
FIG. 4 shows a perspective side cut view of an example of a sleeve with an example of a synchronizing assembly.

Referring now to FIGS. 3 and 4, the synchronization assembly 24 comprises a first synchronizer ring 32 and second synchronizer ring 34. The synchronizer rings comprise respectively first 320 and second 340 synchronizer ring teeth on respective outer surfaces thereof. The synchronizer rings may comprise respectively a first friction surface 72 and a second friction surface 74. The support body 28 is positioned between the first 32 and second 34 synchronizer rings. The support body 28 and the synchronizer rings 32 and 34 are supported by and rotate together with the sleeve 30.

Figure 6A:
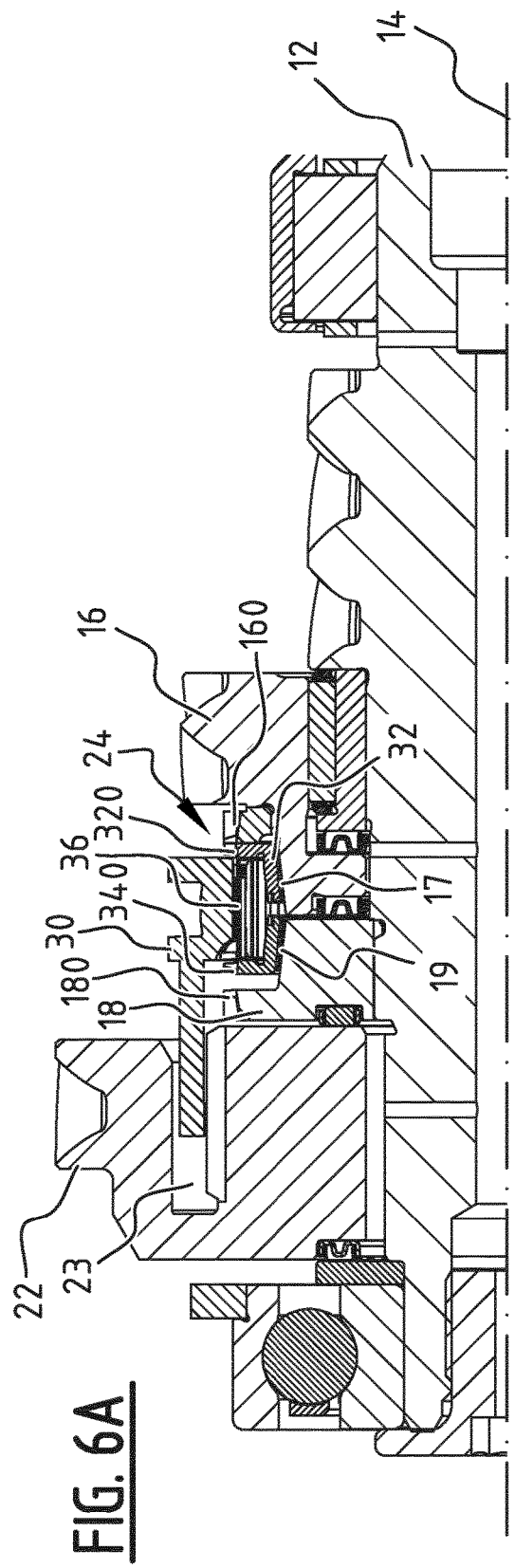
FIG. 6A shows a cross section view of the example of the lay shaft assembly with the sleeve in a neutral position.
Figure 6B:
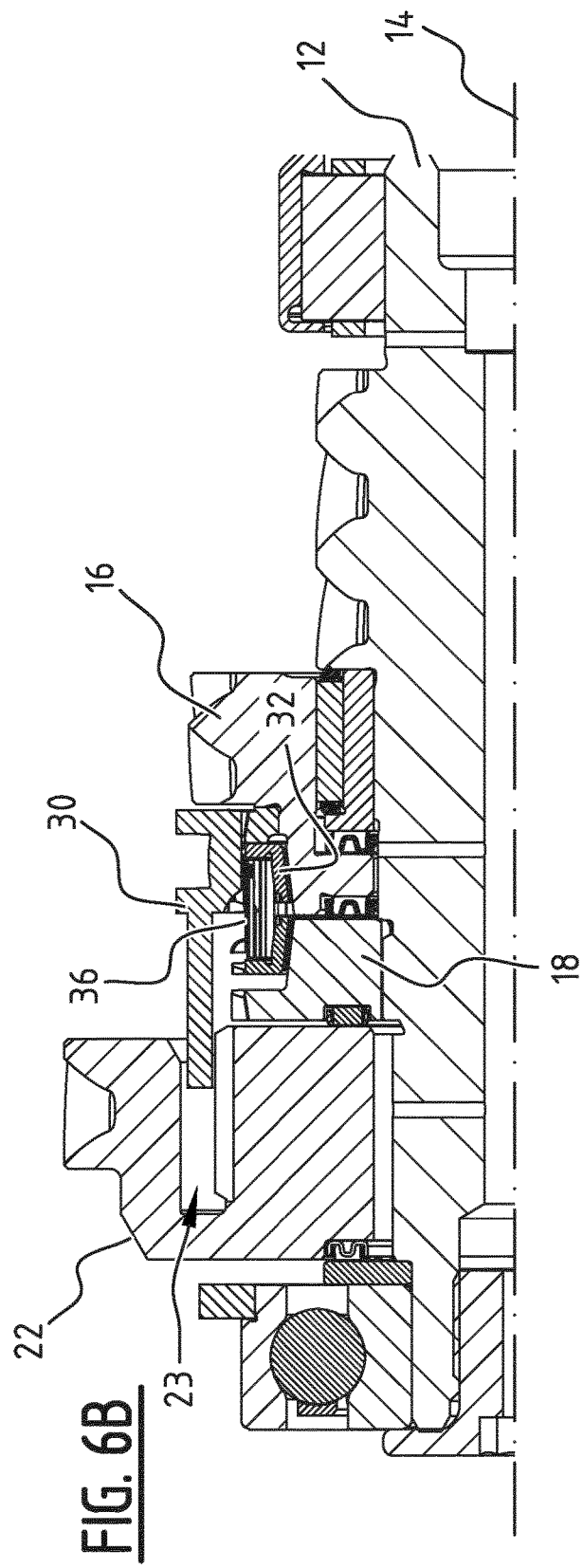
FIG. 6B shows a cross section view of the example of the lay shaft assembly with the sleeve in a first engaged position engaging with an example of the first gear wheel.
Figure 7A:
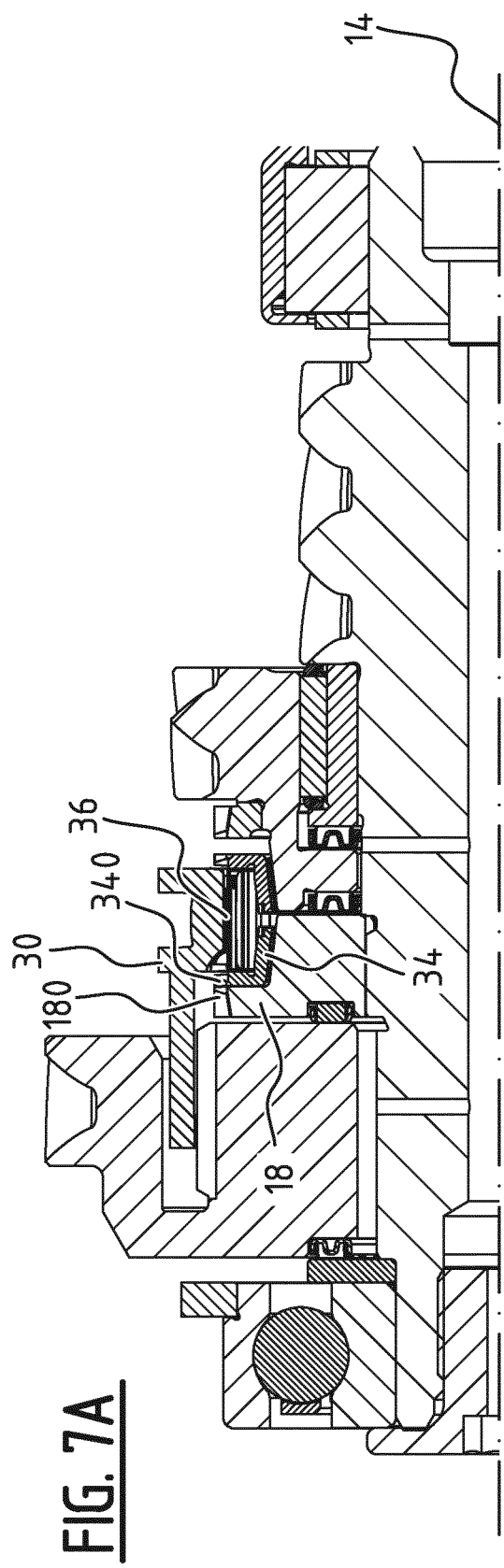
FIG. 7A shows a cross section view of the example of the lay shaft assembly with the sleeve again in the neutral position.

The first synchronizer ring 32 is configured to synchronize a rotation of the sleeve 30 with a rotation of the first gearwheel 16 before the sleeve 30 couples to the first gearwheel 16. As is shown in FIGS. 6A and 6B, the sleeve 30 can be moved from the neutral position to the first engaged position, wherein the sleeve 30 and the first gearwheel 16 are mechanically coupled and torque can be transferred from the driven gearwheel 22 to the first gearwheel 16. The first gearwheel 16 in this example can freely rotate around the lay-shaft 12 and is, for example, associated with the reverse gear.

Before being in the first engaged position, the sleeve has to overcome the biasing force applied by the biasing mechanism 36. This causes the sleeve 30 to apply a force in the axial direction towards the first synchronizer ring 32. The first synchronizer ring 32 is then pushed against the outer circumferential surface 17, which, like circumferential surface 19, is tapered in the shown example. Since the synchronizer rings are rotating together with the sleeve 30, when the first synchronizer ring 32 pushes against the outer circumferential surface 17, due to friction forces the first gear wheel 16 will ultimately rotate in sync with the sleeve 30. Once the sleeve 30 and the synchronizer ring 32 are in synchronized rotation, the sleeve can be slid further over the first teeth 160 of the first gearwheel 16 at an outer surface thereof, so that torque can be transferred from the driven gearwheel 22 to the first gearwheel 16. The first 320 and second 340 synchronizer ring teeth help to rotationally align the teeth of the sleeve 30 with respective grooves or spaces between respective teeth of the first 16 and second 18 gear wheel.

Figure 7B:
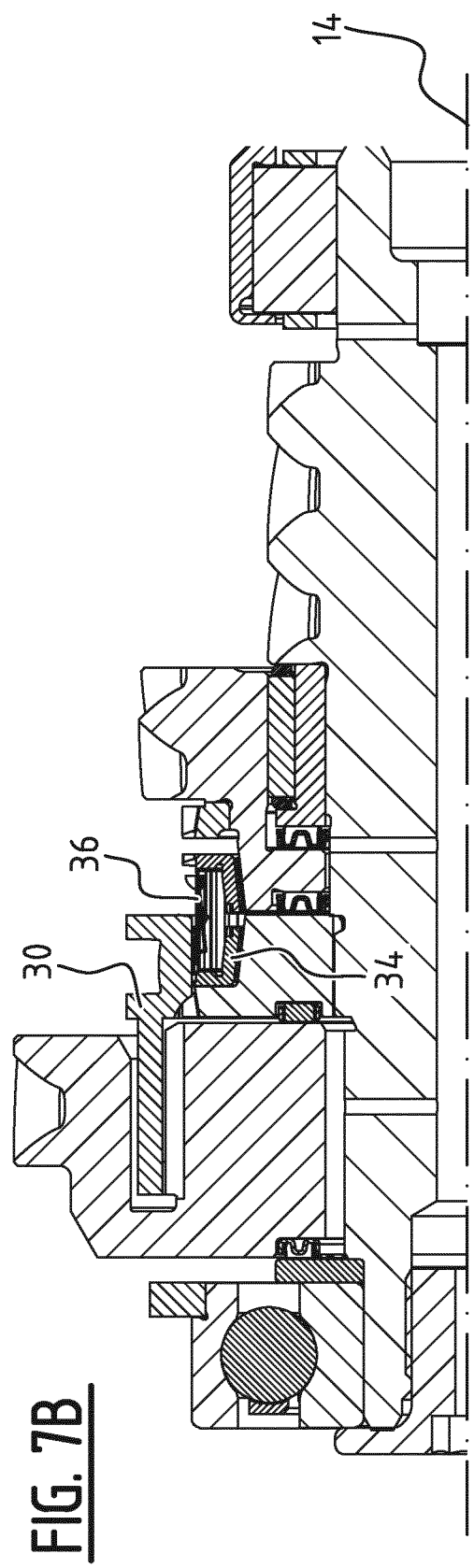
FIG. 7B shows a cross section view of the example of the lay shaft assembly with the sleeve in a second engaged position with an example of the second gear wheel.

The synchronization assembly 24 further comprises a second synchronizer ring 34 which is configured to synchronize a rotation of the sleeve 30 with a rotation of the second gearwheel 18 before the sleeve 30 couples to the second gearwheel 18. The sleeve 30 can be slid to the second engaged position shown in FIG. 7B.

Before being in the second engaged position, the sleeve 30 has to overcome the biasing force applied by the biasing mechanism 36. This causes the sleeve 30 to apply a force in the axial direction towards the second synchronizer ring 34. The first synchronizer ring 34 in turn is then pushed against the outer circumferential surface 19, which is tapered in the shown example. Since the synchronizer rings are rotating together with the sleeve 30, when the second synchronizer ring 34 pushes against the outer circumferential surface 19, due to friction forces the second gear wheel 18 will after some time rotate in sync with the sleeve 30. Once the sleeve 30 and the synchronizer ring 32 are in synchronized rotation, the sleeve 30 can be slid further over the second teeth 180 of the second gear wheel 18 at an outer surface thereof, so that torque can be transferred from the driven gearwheel 22 to the second gearwheel 18.

Figure 5:
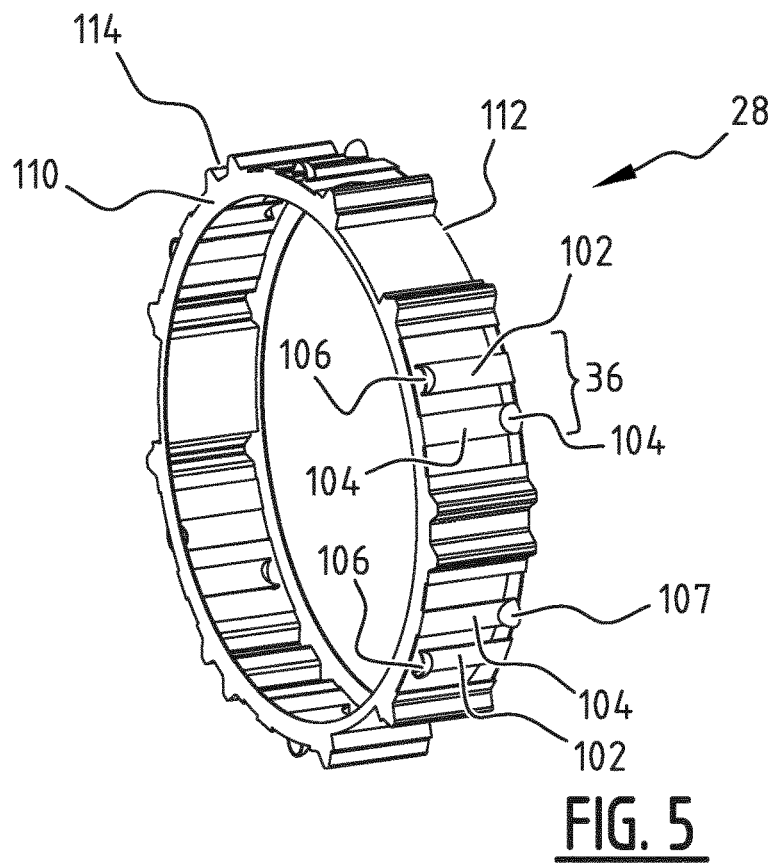
FIG. 5 shows a perspective side view of an example of a support body of the example of the synchronizing assembly.

A first embodiment of the support body 28 is shown FIG. 5. Here the support body 28 comprises the biasing mechanism in an integrated way. The support body 28 comprises a first axial end surface 112 and a second axial end surface 110. The support body 28 comprises a first supporting structure 114 positioned at an outer side of the support body 28 and configured to contact with respective one or more complementary supporting structures at an inner side of the sleeve 30, such that the ring shaped support is supported by the sleeve and rotates with the sleeve around a central axis when the ring shaped support is placed along the inner side of the sleeve.

The first supporting structure is configured such as to at least partially enable axial movement of the support body 28 to the sleeve 30 and to limit rotational movement of the support body 28 relative to the sleeve 30. The support structures are preferably configured such that some play is present in the rotation of support body 28 to the sleeve 30, such that the alignment of the various teeth can occur. Beneficially, the support body 28 can be shaped by deforming a metallic plate. The metallic plate can be deformed, for instance, stamping, indenting, cutting, bending or punching and any combination thereof.

The biasing mechanism 36 may comprise a plurality of biasing elements which may each comprise a first end and a second end, wherein the biasing elements are lever shaped and each extend from the first end to the second end in a direction parallel to the central axis, wherein the first end is in a fixed position relative to the support body and the second end is configured to reversibly bend in a radial direction with respect to the central axis, wherein preferably the biasing means are shaped as leaf springs.

As can be seen in FIG. 5, the biasing mechanism 36 may comprise biasing members here embodied by leaf springs or tongues 102 and 104, which can be described as lever shaped. The leaf springs extend parallel to the central axis 14. The leaf spring 102 is of a first type extends from the first end 112 of the support body 28 to the second end 110 of the support body 28 and is configured to bias the sleeve 30 towards the decoupled position (FIG. 6A and FIG. 7A) in a first axial direction from the first gearwheel 16 towards the second gearwheel 18.

The leaf spring 104 of the second type extends from the second end 110 to the first end 112 of the support body 28 and is configured to bias the sleeve 30 towards the decoupled position in a second axial direction opposite the first axial direction, from the second gearwheel 18 towards the first gearwheel 16.

The leaf springs 102 and 104 each comprise a protrusion 106 and 107 at the outer end thereof and extending radially outwards. In this example, the protrusion is ball or spherically shaped.

As shown in FIG. 15, the sleeve 30 comprises respective complementary depressions or detents for receiving the protrusions. The sleeve 30 comprises depressions 62 in teeth 61 for receiving the protrusions 106 of the leaf spring 104 of the second type. Likewise, the sleeve 30 comprises depressions 66 in teeth 64 for receiving the protrusions 107 of the first type. The protrusions 106 and 107 and the depressions 62 and 66 are positioned such that the leaf springs 102 and 104 are in an unbended resting position when the sleeve 30 is in the decoupled (central) position.

The teeth 61 and 64 also function for the synchronizing of the first or second gear wheels with the sleeve 30 as described above. These teeth 61 and 64 thus serve an additional function beyond synchronizing and locking with gear wheels 16 and 18, allowing the sleeve to be more compact. Also, less parts are required compared to use of, for instance, ball-spring elements, that work together with detents are not required. The leaf springs, being shaped in the axial direction, use much less space than the standard ball-spring elements. The sleeve 30 further comprises teeth 68 that only serve for the synchronizing and locking function.

Figure 8:
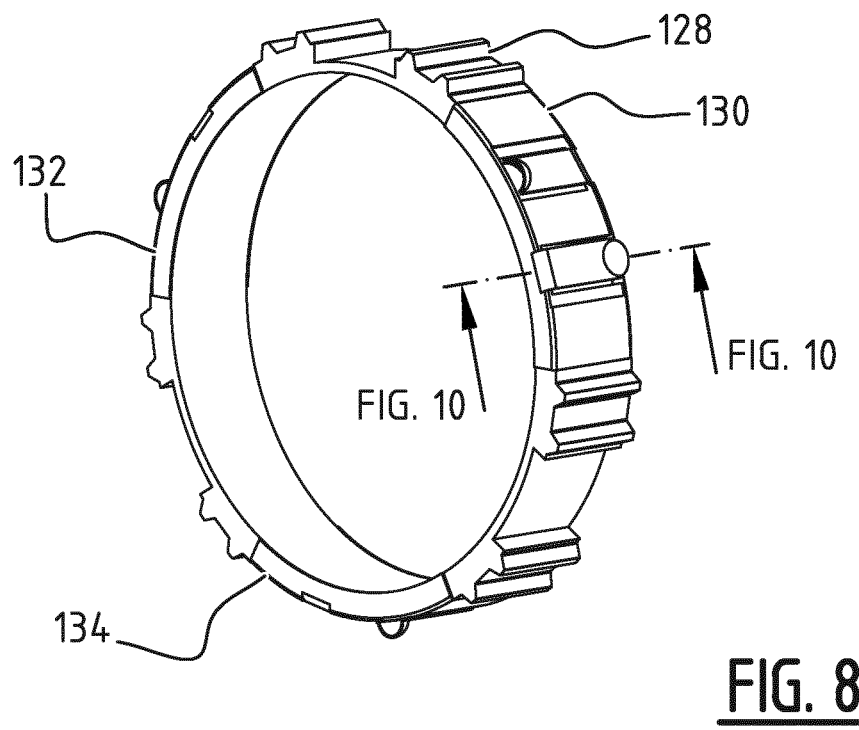
FIG. 8 shows a perspective side view of another example of a support body with example of a biasing mechanism inserts placed thereon.
Figure 9:
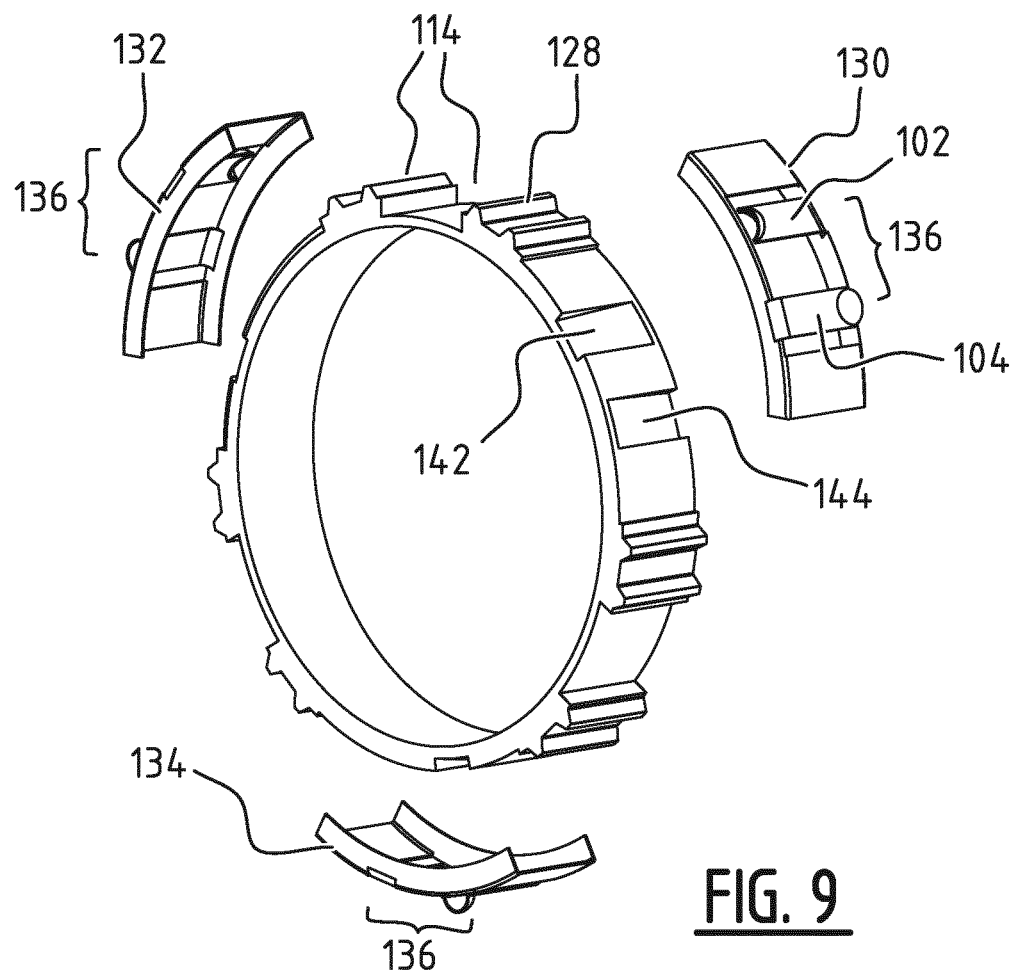
FIG. 9 shows an exploded perspective side view of FIG. 8.

FIGS. 8 and 9 show a second embodiment of the support body as support body 128. Unless stated otherwise, the support body 128 provides the same function as, and is similar to, the support body 28. Support body 128 is configured to receive separate biasing mechanism inserts or overlays 130, 132 and 134.

The support body 128 further comprises first spring bases 142 and second spring bases 144 positioned such that a deflection of respectively the first type of biasing mechanism, in particular leaf spring 102, and the second biasing mechanism, in particular leaf spring 104, is limited.

Figure 10:
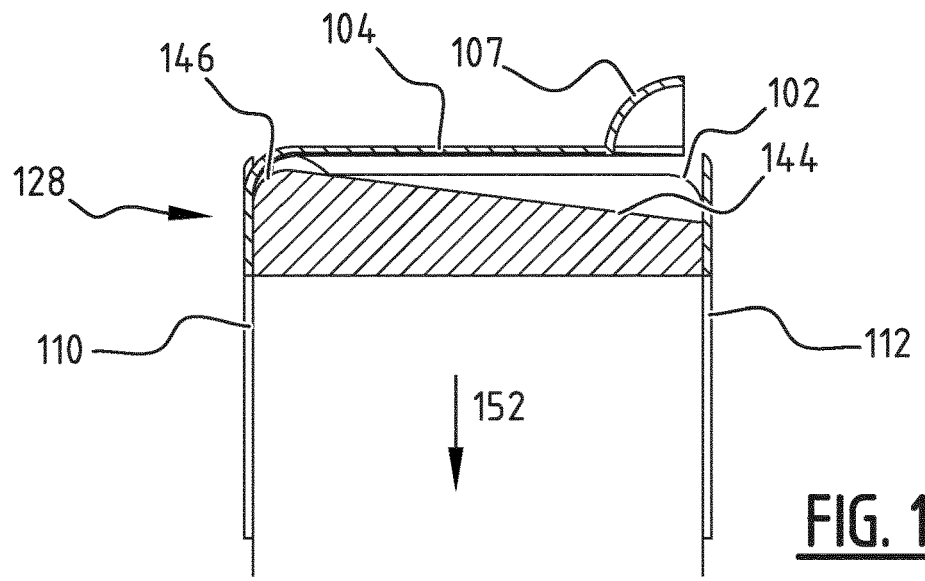
FIG. 10 shows the cut side view as indicated in FIG. 8 showing a first example configuration of the biasing mechanism and the support body.
Figure 11:
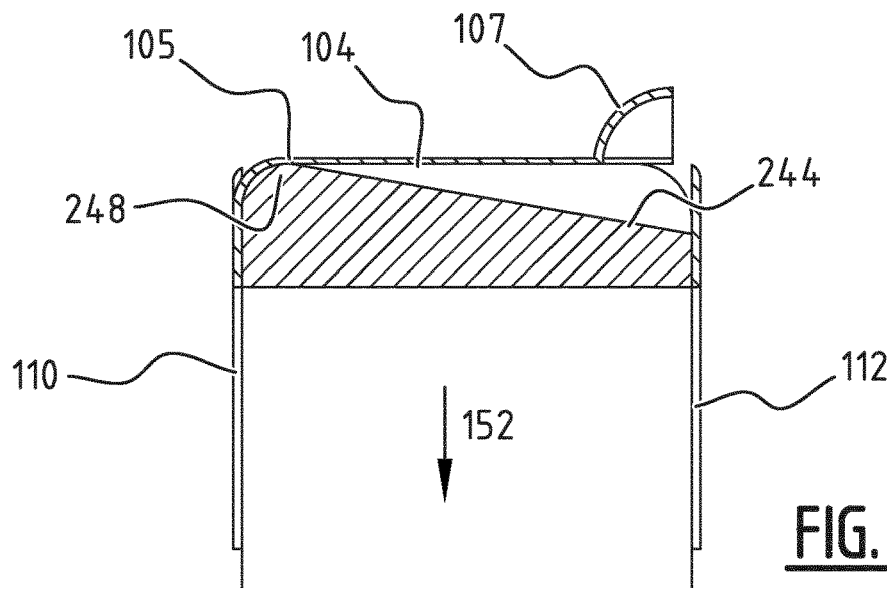
FIG. 11 shows a cut side view showing a second example configuration of the biasing mechanism and the support body.
Figure 12:
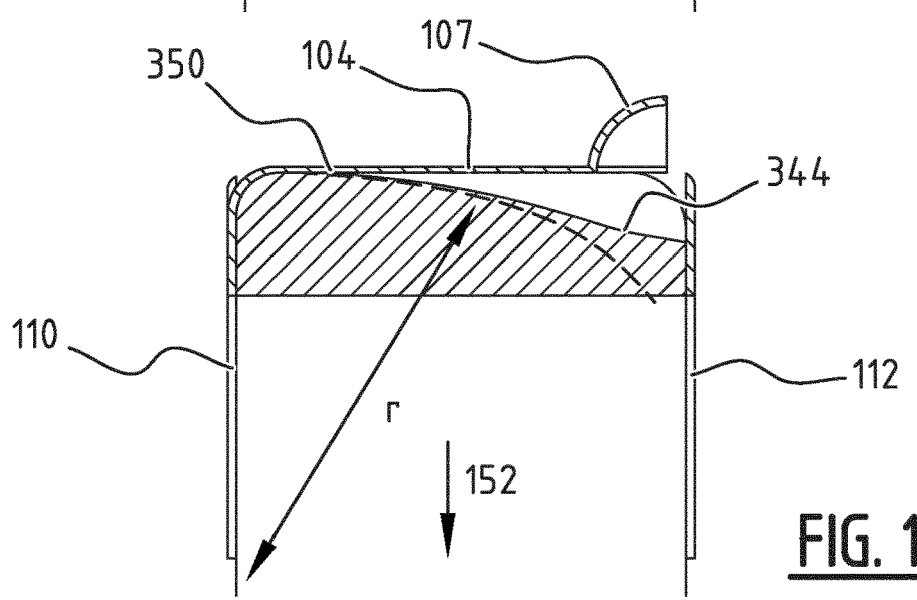
FIG. 12 shows a cut side view showing a third example configuration of the biasing mechanism and the support body.

Several embodiments of the spring base are shown in FIGS. 10-12. Although only the bases for the leaf springs 104 of the second type are shown, there are corresponding embodiments of the spring bases 142. In FIG. 10 the spring base 144 is sloped in the axial direction with a constant. The spring 104 is free to move in the radial direction 152 along its entire length. In FIG. 11, the spring base 244 is sloped with a constant slope, but comprises contacting part 248 in contact with a base section 105 of the leaf spring 104. This increases the spring constant with increased deflection of the leaf spring 104.

In FIG. 12, the spring base 344 comprises an arc shape. A part 350 of the spring base 344 extending from the second edge surface 110 towards the first edge surface 112 follows the arc with radius r drawn schematically with dotted line in FIG. 12. In this configuration, the spring coefficient of leaf spring 104 is increased even further upon increased deflection of the leaf spring 104. The effective arm length of the leaf spring 104 is reduced upon increased deflection.

By changing the shape of the spring bases, the biasing force of the biasing mechanism can thus be adapted.

Figure 13:
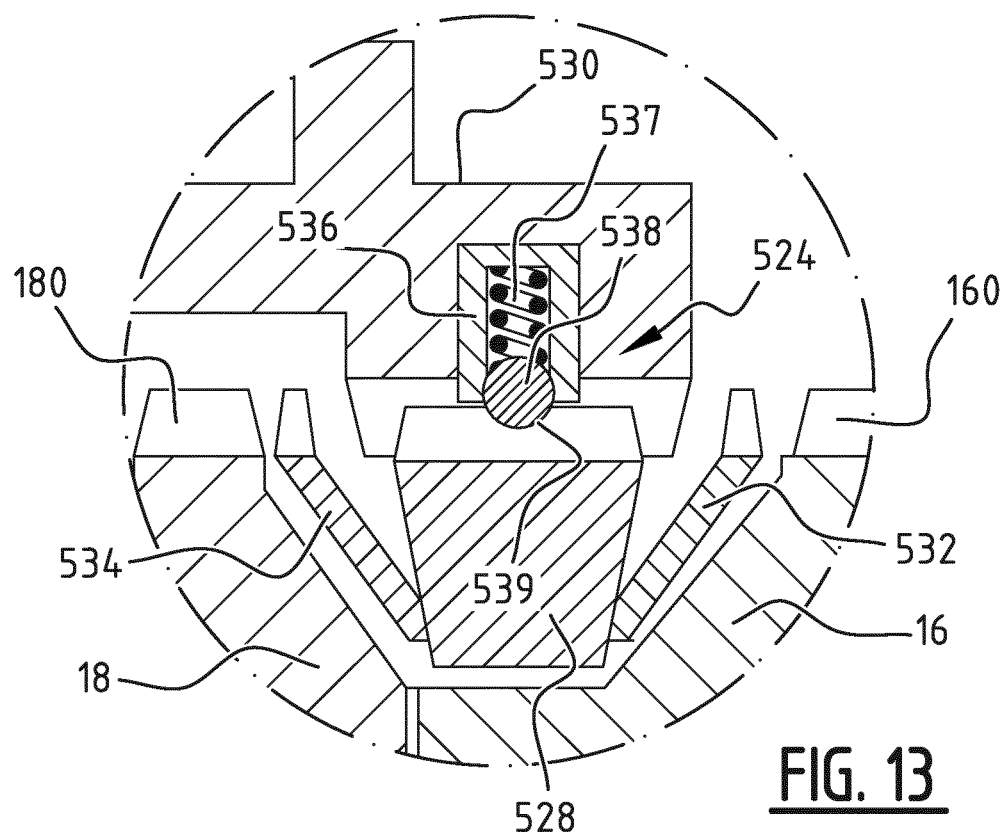
FIG. 13 shows a schematic side view of another example of a sleeve with synchronizing assembly.
Figure 14:
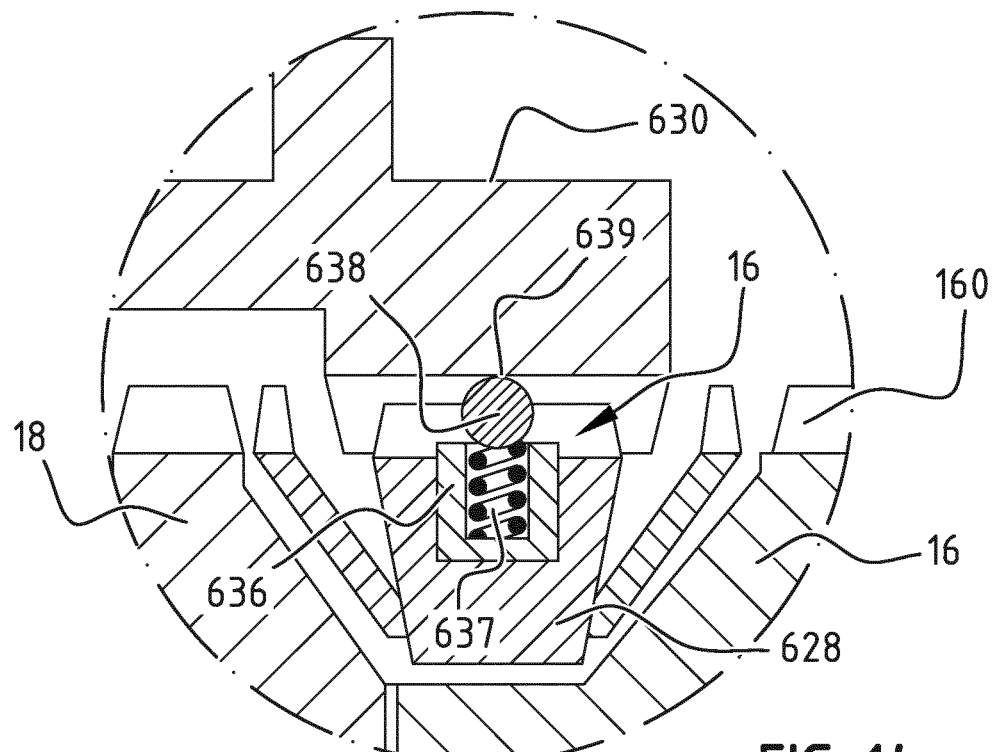
FIG. 14 shows a schematic side view of yet another example of a sleeve with synchronizing assembly.

In FIGS. 13 and 14, two additional embodiments of the sleeve and synchronizing assembly 524 are shown. In FIG. 13, the sleeve 530 comprises the biasing mechanism here including a spring 537 and a ball 538, while the support body 528 comprises a supporting depression 539 for supporting the synchronizing mechanism, in particular the ball 538 thereof, and is thus shaped complementarily. The sleeve 530 and the support body 528 thus work together in a similar way as described above for the other embodiments. The sleeve 530 is biased to the neutral position. The synchronizing assembly 524 further comprises first 532 and second 534 synchronizer rings. When the sleeve 530 is moved axially (parallel to the central axis) also here the support body 528 pushes axially against either one of the first and second synchronizer rings, and thus causes the rotation of the sleeve 530 and either one of the first 16 and second 18 gear wheels as described above. The sleeve 530 may comprise three springs and balls equally spaced along the circumference of the sleeve. The support body 528 then comprises three supporting depressions 539 equally spaced along the circumference of the support body 528, which is ring shaped.

Figure 16:
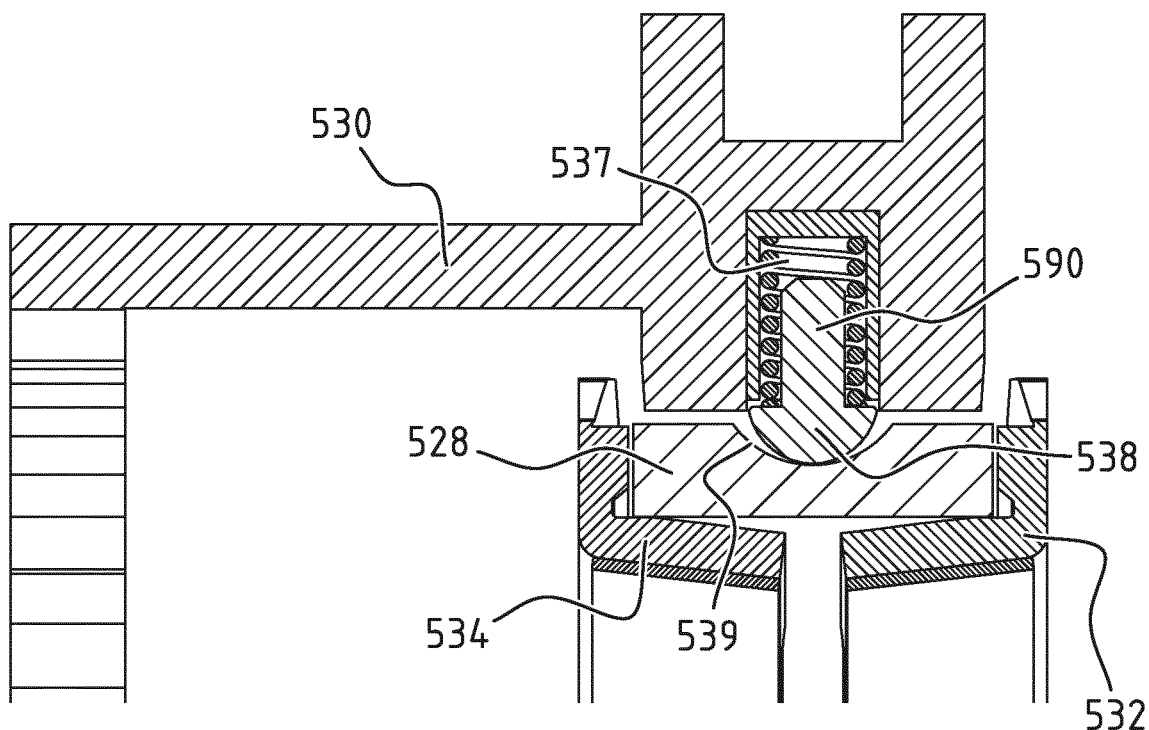
FIG. 16 shows a side view cut of an example of the sleeve with synchronizer assembly similar to FIG. 13.

A similar embodiment as in FIG. 13 is shown in FIG. 16, but the ball 538 is formed as a ball shaped head 538 which is connected to a pin shaped base 590. In general, the ball 538 and the ball shaped head 538 together with the pin shaped base 590 represent a biasing member. In the shown position, the pin shaped base 590 resides inside a cavity within the sleeve 530, while the ball shaped head 538 is mostly placed within the depression 539. The relative sizes, although not necessarily up to scale, are similar to those of e.g. FIGS. 3, 6A, 6B, 7A, and 7B. The depression 539 in the support body 528 is oval shaped and is broader in width than the ball shaped head 538. This shape results a gradual increase in the force applied laterally to the synchronizer rings 532 and 534 when the sleeve is moved axially any either direction.

Figure 17:
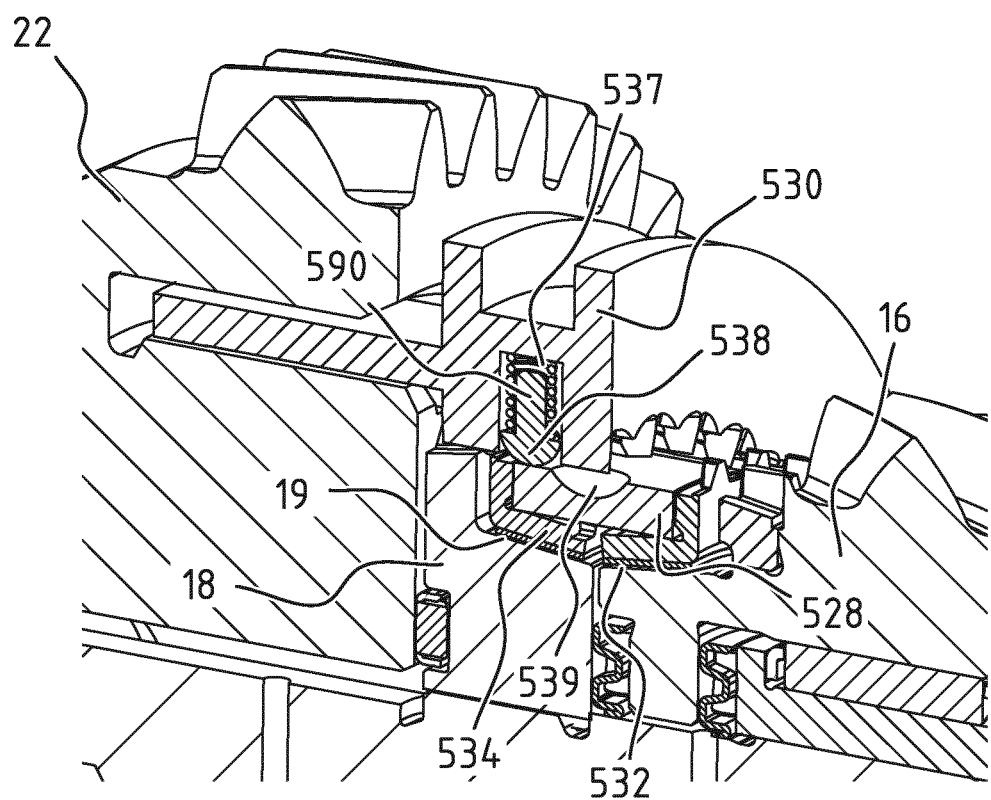
FIG. 17 shows a perspective side view cut of the example of FIG. 16 in a lay-shaft assembly.

In FIG. 17 the sleeve 530 and the synchronizer assembly as shown in FIG. 16 are shown in a lay-shaft assembly similar to that of FIG. 3. The sleeve 530 is in the second engaged position wherein it is engaged with the second gear wheel 18, as can be seen, the biasing mechanism including a biasing member, in this example comprising spring 537 and pin/ball head combination 590 and 538, in a position where the biasing member is pushed into a cavity in the sleeve 538. In this position, the ball shaped head 538 is mostly inside the cavity within the sleeve 530.

Figure 18:
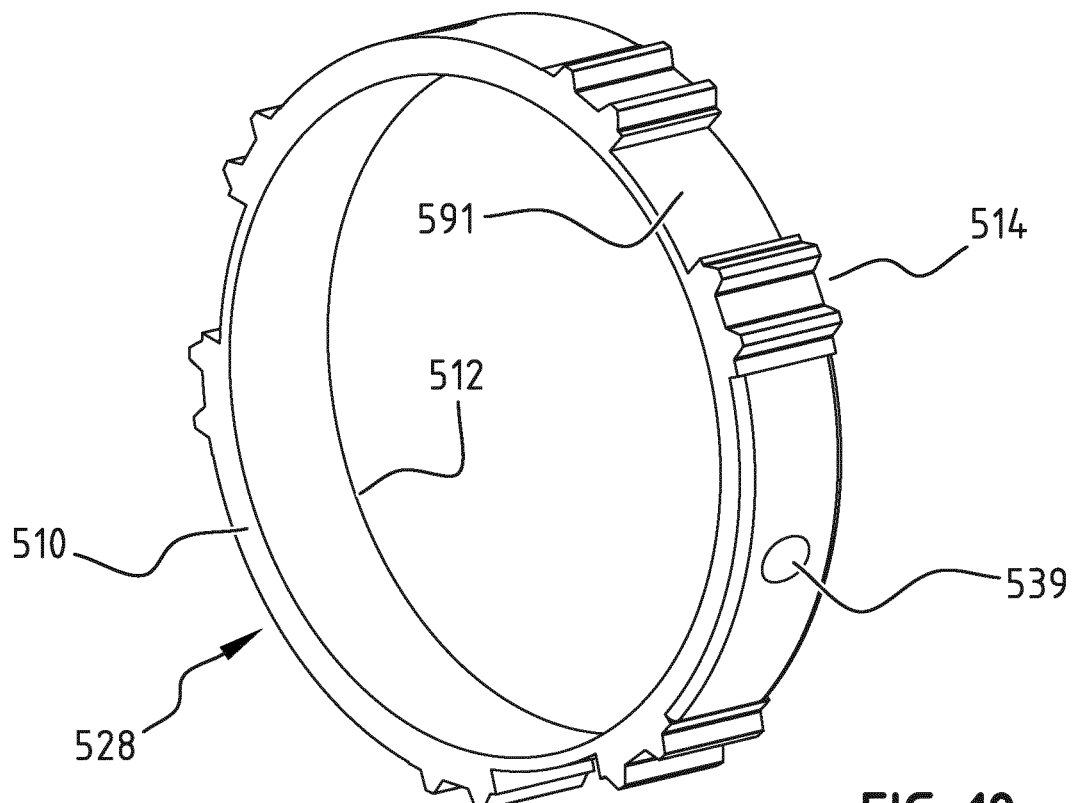
FIG. 18 shows a perspective side view of a support body of the example synchronizer assembly of FIG. 16.
Figure 19:
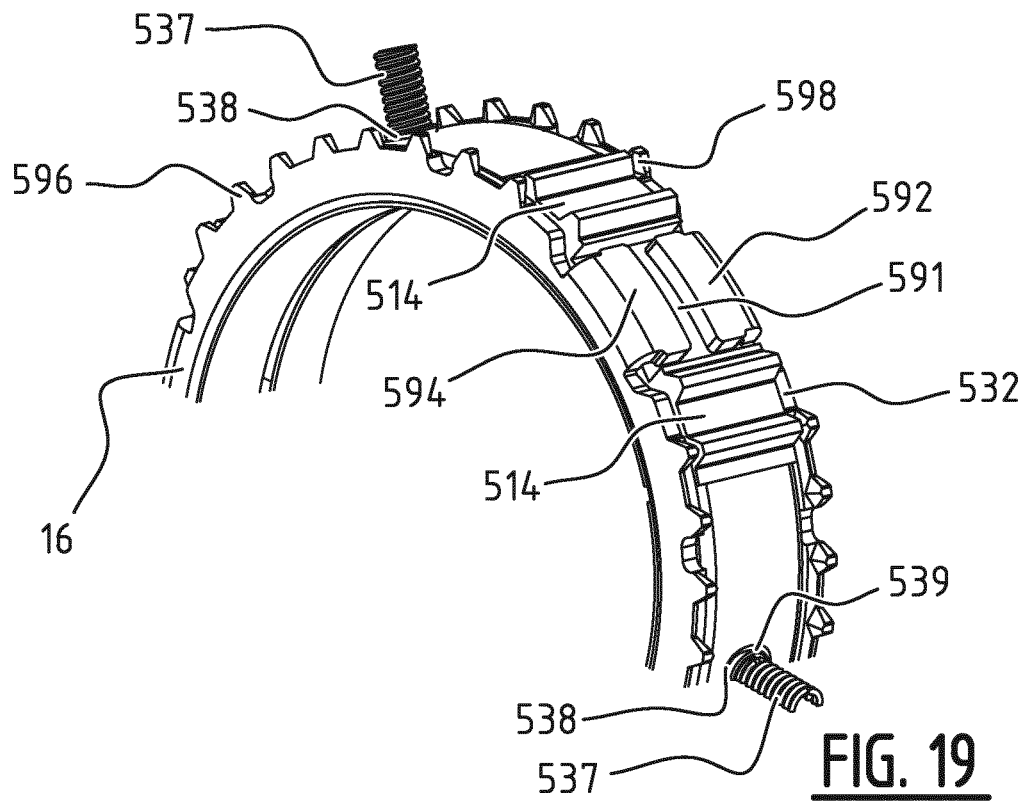
FIG. 19 shows a perspective side view of the support body of the example of FIG. 18 together with various other elements of the synchronizer assembly.

In FIGS. 18 and 19 the parts of the synchronizer assembly as shown in FIGS. 16 and 17 are shown in more detail. The support body 528 is shown in FIG. 18 with its depression 539, which in this example is an oval shaped depression 539. The depression 539 is for supporting the biasing mechanism, e.g. comprising the spring 537 and ball 538 (or ball shaped head 538 and pin shaped base 590).

The support body in general acts as a support for at least partially supporting the biasing mechanism. The depression 539 is configured to translate the spring force, which is in the radial direction with respect to the central axis, to an axial biasing force.

Also visible are the first supporting structures 514 positioned at the outer side of the ring shaped support body 528. The supporting structures 514 here comprise splines or teeth so that the support body 528 rotates at the same speed as the sleeve 530. The support structures 514 are configured to overcome the drag torque generated by the respective synchronizer rings 532 and 534 when synchronizing.

FIG. 19 shows the support body together with the first 532 and second 534 synchronizer rings, biasing members and the springs 537. The synchronizer rings are held in position by respective first 592 and second 594 clamping extensions. These clamping extensions 592 and 594 are configured to grab a clamping section 591 of the support body 528. In the shown example, the support body 528 has three clamping sections 591, and the synchronizer rings respective each comprise three clamping extensions. The clamping extensions 592 and 594 are configured such that rotational play is allowed, preferably in the range of 2° to 10°, most preferred and in this example about 5°.

In FIG. 14, the support body 628 comprises the biasing mechanism here including a spring 537 and a ball 638, while the sleeve 630 comprises a supporting depression 639 for supporting the synchronizing mechanism, in particular the ball 638 thereof, and is thus shaped complementarily. The sleeve 630 and the support body 628 thus work together in a similar way as described above for the other embodiments. The sleeve 630 is biased to the neutral position. The synchronizing assembly 624 further comprises first 632 and second 634 synchronizer rings. When the sleeve 630 is moved axially also here the support body 628 pushes axially against either one of the first and second synchronizer rings, and thus causes the rotation of the sleeve 630 and either one of the first 16 and second 18 gear wheels as described above. The sleeve 630 may comprise three springs and balls equally spaced along the circumference of the sleeve. The support body 628 then comprises three supporting depressions 639 equally spaced along the circumference of the support body 628, which is ring shaped.

Integration of this ball-detent like structure into either the sleeve or the support body, in particular also when the synchronizing assembly 524 or 624 is placed between the first and second gearwheels, more particular between the tapered axial outer circumferential end surfaces thereof, also here the size and number of parts of a lay-shaft assembly comprising such a sleeve and synchronizing assembly is reduced.

The description of the different illustrative configurations has been presented for purposes of illustration and description and is not intended to be exhaustive or limited to the configurations in the form disclosed. Many modifications and variations will be apparent to those of skill in the art. Further, different illustrative configurations may provide different features as compared to other illustrative configurations. The configuration or configurations selected are chosen and described in order to best explain the principles of the configurations, the practical application, and to enable others of ordinary skill in the art to understand the disclosure for various configurations with various modifications as are suited to the particular use contemplated.

The invention claimed is:

1. A lay-shaft assembly for use in a vehicle transmission, comprising:
   a lay-shaft arranged rotatably around a central axis;
   a first gearwheel arranged rotatably around the lay-shaft and the central axis;
   a second gearwheel arranged around the lay-shaft around the central axis; and
   a clutching assembly arranged rotatably around the lay-shaft and the central axis and comprising:
   a driven gearwheel, and
   a clutching mechanism comprising a movable sleeve for selectively coupling rotation of the driven gearwheel to either of the first gearwheel and the second gearwheel,
   wherein the clutching mechanism further comprises a synchronization assembly arranged for synchronizing rotation of the driven gearwheel with the first gearwheel or the second gearwheel,
   wherein the first and second gearwheels extend adjacently with respect to each other seen along the central axis, and
   wherein the synchronizing assembly is positioned between adjacent respective outer circumferential surfaces of the adjacent first and second gearwheels and the sleeve.

2. The lay-shaft assembly according to claim 1, wherein the synchronization assembly comprises:
   biasing means configured for biasing the sleeve to a decoupled position wherein the sleeve is disengaged from the first gearwheel and the second gearwheel, and
   a support body configured for at least partially supporting the biasing means and positioned between the sleeve and the first and second gearwheels, adjacent to the outer circumferential surface of the first gearwheel and the outer circumferential surface of the second gearwheel.

3. The lay-shaft assembly according to claim 2, wherein the support body is ring shaped, and wherein the support body is positioned along an inner surface of the sleeve.

4. The lay-shaft assembly according to claim 2, wherein the support body is positioned at least partially around the first and second gear.

5. The lay-shaft assembly according to claim 2, wherein the biasing means comprises a first type of biasing means and a second type of biasing means, wherein the first type of biasing means is configured to bias the sleeve towards the decoupled position in a first axial direction from the first gearwheel towards the second gearwheel, wherein the second type of biasing means is configured to bias the sleeve towards the decoupled position in a second axial direction from the second gearwheel towards the first gearwheel, and wherein the support body comprises the biasing means.

6. The lay-shaft assembly according to claim 2, wherein each of the biasing means comprises a first end and a second end, wherein the biasing means comprises lever shaped elements and each extend from the first end to the second end in a direction parallel to the central axis, wherein the first end is in a fixed position relative to the support body and the second end is configured to reversibly bend in a radial direction with respect to the central axis, wherein the biasing means elements are shaped as leaf springs, wherein each of the biasing means comprises a protrusion at the second end thereof and extending towards the sleeve, wherein the sleeve comprises a complementary depression for receiving the protrusion, wherein the protrusion and the depression are positioned such that the biasing means are in an unbended resting position when the sleeve is in the decoupled position.

7. The lay-shaft assembly according to claim 2, wherein the synchronization assembly comprises:
   a first synchronizer ring which is configured to synchronize a rotation of the sleeve with a rotation of the first gearwheel before the sleeve couples to the first gearwheel, and
   a second synchronizer ring which is configured to synchronize a rotation of the sleeve with a rotation of the second gearwheel before the sleeve couples to the second gearwheel,
   wherein the support body is positioned between the first synchronizer ring and the second synchronizer ring, and
   wherein the support body is movable in an axial direction along the central axis towards the first synchronizer ring and towards the second synchronizer ring to cause the respective one of the first and second synchronizer ring to synchronize the rotation of the sleeve with respectively the first and second gearwheel.

8. The lay-shaft assembly according to claim 1, wherein the driven gearwheel extends adjacent to the first or second gearwheel.

9. The lay-shaft assembly according to claim 1, wherein the first and second gearwheels respectively comprise a first axial end and a second axial end and the first axial end of the first gearwheel is adjacent to the second axial end of the second gearwheel, wherein the outer circumferential surface of first gearwheel is tapered towards the first axial end thereof and wherein the outer circumferential surface of the second gearwheel is tapered towards the second axial end thereof, and wherein the synchronizing assembly is positioned between the tapered outer circumferential surfaces of the adjacent first and second gearwheels and the sleeve.

10. The lay-shaft assembly according to claim 1, wherein:
    the sleeve comprises splines on an inner surface thereof,
    the first gearwheel comprises first teeth on an outer surface thereof, and
    the second gearwheel comprises second teeth on an outer surface thereof, wherein the splines are configured to mesh with the first teeth and with the second teeth.

11. The lay-shaft assembly according to claim 1, wherein the first and second gearwheels are movably arranged with respect to each other, wherein friction reduction means are positioned between the first gearwheel and second gearwheel, wherein the friction reduction means are bearing means such as needle bearings, and wherein only the friction reduction means are positioned between the first gearwheel and second gearwheel at respective adjacent surfaces of the first and second gearwheels.

12. The lay-shaft assembly according to claim 1, wherein the lay-shaft comprises a third gearwheel fixedly connected to the lay-shaft and arranged to rotate with the lay-shaft around the central axis, and wherein the first gearwheel is fixedly connected to the lay-shaft such that rotation of the first gearwheel causes rotation of the third gearwheel.

13. A ring-shaped biasing means support for use in a clutching mechanism comprising a movable cylindrically shaped clutching sleeve, the ring-shaped support comprising:
one or more first supporting structures positioned at an outer side of the ring-shaped biasing means support and configured to contact with respective one or more complementary supporting structures at an inner side of the sleeve, such that the ring-shaped support is supported by the sleeve and rotates with the sleeve around a central axis when the ring-shaped biasing means support is placed along the inner side of the sleeve; and
one or more second supporting structures each at least partially positioned along an outer side of the ring-shaped support and configured to support biasing means configured for biasing the sleeve to a central position with respect to the ring-shaped biasing means support,
wherein the movable cylindrically shaped clutching sleeve is movable to selectively couple rotation of a driven gearwheel to either of a first gearwheel and a second gearwheel with the first gearwheel and the second gearwheel being adjacent to each other along the central axis.

14. The ring-shaped biasing means support according to claim 13, wherein the one or more first supporting structures are configured such as to at least partially enable axial movement of the ring-shaped biasing means support relative to the sleeve and to limit rotational movement of the ring-shaped biasing means support relative to the sleeve, and wherein the support structures are configured such that play is present in the rotation of the ring-shaped biasing means support relative to the sleeve.

15. The ring-shaped biasing means support according to claim 13, wherein the ring-shaped biasing means support is configured to be supported only by the sleeve and is not coupled or bearing mounted to a lay-shaft along the central axis by any other mechanism.

16. The ring-shaped biasing means support according to claim 13, further comprising a first axial end surface and a second axial end surface of the ring-shaped biasing means support with respect to the central axis extending centrally through the ring-shaped biasing means biasing means support, wherein the ring-shaped biasing means support comprises the biasing means, wherein the biasing means each comprise a first end and a second end, and wherein the biasing means comprises lever shaped leaf springs and each extend from the first end to the second end in a direction parallel to the central axis, wherein the first end is in a fixed position relative to the ring-shaped biasing means support and the second end is configured to reversibly bend in a radial direction with respect to the central axis.

17. The ring-shaped biasing means support according to claim 16, wherein the biasing means comprises a first type of biasing means and a second type of biasing means, wherein the first type of biasing means is configured to bias the sleeve towards the central position in a first axial direction from the first axial end surface towards the second axial end surface, and wherein the second type of biasing means is configured to bias the sleeve towards the central position in a second axial direction from the second axial end surface to the first axial end surface.

18. A biasing means insert configured to be attached to the ring-shaped biasing means support according to claim 13, wherein the biasing means insert comprises:
the biasing means configured for biasing the sleeve to a central position with respect to the ring-shaped support when the biasing means insert is attached to the ring-shaped support, and
one or more supporting structures each at least partially positioned along an inner side of the biasing means insert and configured to attach to complementary supporting structures of the ring-shaped biasing means.

19. The biasing means insert according to claim 18, wherein the biasing means each comprise a first end and a second end, wherein the biasing means are comprises elements that are lever shaped and each extend from the first end to the second end in a direction parallel to the central axis, and wherein the first end is in a fixed position relative to the biasing means insert and the second end is configured to reversibly bend in a radial direction with respect to the central axis, wherein the biasing means elements are shaped as leaf springs.

20. The biasing means insert according to claim 18, wherein the biasing means comprises a first type of biasing means and a second type of biasing means, wherein the first type of biasing means is configured to bias the sleeve towards the central position in a first axial direction from a first axial end surface towards a second axial end surface of the biasing means insert, and wherein the second type of biasing means is configured to bias the sleeve towards the central position in a second axial direction from the second axial end surface to the first axial end surface.

* * * * *

UNITED STATES PATENT AND TRADEMARK OFFICE
CERTIFICATE OF CORRECTION

| | | |
|---|---|---|
| PATENT NO. | : 12,158,205 B2 | Page 1 of 1 |
| APPLICATION NO. | : 18/010670 | |
| DATED | : December 3, 2024 | |
| INVENTOR(S) | : Yildir | |

It is certified that error appears in the above-identified patent and that said Letters Patent is hereby corrected as shown below:

In the Claims

Column 14, Line 32, Claim 19, please remove "are".

Signed and Sealed this
Twenty-ninth Day of April, 2025

Coke Morgan Stewart
*Acting Director of the United States Patent and Trademark Office*